3,041,302
RESIN COMPOSITION COMPRISING CONDENSATION PRODUCT OF DICARBOXYLIC ACID ANHYDRIDE WITH ESTER OF DIGLYCIDYL ETHER OF DIHYDRIC PHENOL WITH MONOCARBOXYLIC AROMATIC ACID AND PREPARATION THEREOF
Frederick S. Leutner, Cleveland Heights, Ohio, assignor, by mesne assignments, to Martin-Marietta Corporation, Chicago, Ill., a corporation of Maryland
No Drawing. Filed Jan. 8, 1959, Ser. No. 785,557
22 Claims. (Cl. 260—31.8)

The present invention relates to improvement in coatings particularly adapted for application to fiber board, pressed wood, plywood, and cellulosic composition board for the production of a porcelain-like cured finish characterized by unusual toughness, excellent resistance to light, high degree of mar resistance, extreme stain resistance and excellent adhesion to the substrate.

While the coatings of the invention are particularly effective and useful when applied to non-metallic surfaces because of the achievement of excellent film properties at low baking temperatures, these coatings are also useful on metal surfaces such as iron or steel which may be acid treated, e.g., with phosphoric acid, or galvanized. The coatings of the invention may also be applied to various other substrates such as aluminum, glass, or various ceramic surfaces.

More particularly, the invention provides new resins in which an epoxy resin is defunctionalized to a predetermined extent with an aromatic monobasic acid by ester formation therewith, the ester being then condensed with a substantially equal molar proportion based on the number of mols of monobasic acid of certain dicarboxylic acid anhydrides. These new resins may be cold-blended with an amino resin and applied from organic solvent solution to form coatings of high gloss, extreme chemical resistance and extreme physical toughness. The coatings of the invention cure, without buffing, to a glossy and brilliant, flat, mirror-like finish, though buffing does function to improve appearance.

The epoxy resins which are used in the invention are substantially diglycidyl ethers of a dihydric phenol, preferably a bisphenol, having an average molecular weight of from 500 to 1500, an hydroxyl functionality of from 3–10 mols per mol of resin and an epoxy equivalency of at least 1.4, more preferably at least 1.8 and desirably about 2.0. Preferred epoxy resins have an average molecular weight of from 600 to 1000 and an hydroxyl functionality of from 4.0–8.0.

The hydroxyl functionality of one mol of epoxy resin may be computed by the following formula:

Hydroxyl functionality
$$=2\left(\text{epoxy value}\times\frac{\text{mol. wt.}}{100}\right)+\text{hydroxyl value}\times\frac{\text{mol. wt.}}{100}$$

in which the epoxy value and hydroxy value are in mols per 100 grams of resin.

The epoxy resins specified above are first reacted with a limited proportion of aromatic monobasic acid such as benzoic acid to cause ester formation. The esterification reaction is desirably effected at a temperature of from 125–275° C., preferably from 150–175° C., in the presence of an alkaline catalyst. The reaction is continued until substantially all of the acid used is removed from the system, as indicated by an acid number below 2.

Other suitable aromatic monobasic acids which may be used are p-butyl benzoic acid, m- or p-toluic acid, p-benzoyl benzoic acid and naphthoic acid.

The ester of epoxy resin with aromatic monobasic acid is then reacted with dicarboxylic acid anhydride. The reaction is effected at a temperature of from 125–200° C. and is continued until the acid number drops below 80. The reaction is desirably carried out in aromatic hydrocarbon solvent solution, e.g., xylol or xylol-butanol, heating being preferably maintained for from 3½–5 hours. The final resin product is not completely reacted and has an acid number of from 30–80, preferably from 40–70.

The dicarboxylic acid anhydrides which are employed in the invention are selected from the group consisting of aromatic ortho-substituted dicarboxylic acid anhydrides, saturated aliphatic dicarboxylic acid anhydrides and mixtures thereof.

Aromatic ortho-substituted dicarboxylic acid anhydrides are illustrated by phthalic anhydride which is preferred for reasons of availability and economy. The ortho-aromatic acid anhydrides are further illustrated by tetrachloro phthalic anhydride and dichloro phthalic anhydride. Anhydrides which are not ortho, e.g., isophthalic anhydride or terephthalic acid are not satisfactory.

Saturated aliphatic dicarboxylic acid anhydrides which are suitable are illustrated by hexahydrobenzene ortho dicarboxylic anhydride, succinic anhydride, glutaric anhydride and adipic anhydride. Unsaturated aliphatic anhydrides are unsuitable since the products produced lack stain resistance.

Mixtures of ortho-aromatic anhydrides and aliphatic anhydrides as well as mixtures of different aliphatic anhydrides or of different aromatic anhydrides may be used as the anhydride reactant. For example, partial replacement of phthalic anhydride with tetrachloro phthalic anhydride improves flame resistance, while partial replacement of phthalic anhydride with adipic anhydride or hexahydrobenzene dicarboxylic acid anhydride improves flexibility as compared with the use of straight ortho phthalic anhydride reactant. The use of chlorendic anhydride is also desirable to improve flame resistance and flexibility.

It is preferred that the anhydride reactant include at least 20% of ortho phthalic anhydride by weight. Up to 20% of dicarboxylic acid anhydrides not included in the groups specified above may be tolerated as part of the anhydride reactant but are preferably absent.

The various reactants which have been specified and their proportions are critical.

It is essential that the total carboxyl functionality supplied by the aromatic monobasic acid and the dicarboxylic acid anhydride be from 70–95%, preferably from 80–92%, of the total hydroxyl functionality supplied by the epoxy resin. At the same time the number of mols of aromatic monobasic acid must be substantially equal to the number of mols of dicarboxylic acid anhydride. By substantially equal is meant that the difference in the number of mols of monobasic dibasic acid must not be more than 10% of the average number of mols. Thus, if 10 mols of total acid are used, the difference between the number of mols of monobasic acid and dibasic acid cannot exceed 1 mol (5.5 mols of one to 4.5 mols of the other). It is lastly essential that the ester of the epoxy resin with aromatic monobasic acid be incompletely reacted with the dicarboxylic acid anhydride as evidenced by an acid number of 30–80, preferably from 40–70.

When the above essential features are observed a resin is provided having a reactivity comparable to that of a mixture of epoxy resin and dicarboxylic acid anhydride (a conventional potting composition which cures at room temperature in a few hours) but which, nevertheless, is stable for many months' storage at room temperature. This stability is maintained in solution and in admixture with amino resin. The proportions specified also appear to be essential to provide adequate cure upon baking in the presence of the amino resin at relatively low baking temperatures of from 275–325° F.

The use of an aromatic monobasic acid is a critical feature of the invention. When aliphatic acids such as a fatty acid, e.g., soya fatty acids or lauric acid, are employed, the product before or after blending with amino resin tends to discolor at elevated baking temperature and lacks stain resistance. Crotonic acid and 2-ethyl hexoic acid have also been found to be unsuitable.

It is surprising to find that the aromatic monobasic acids provide resins which, when blended with hard and brittle amino resins, develop in the form of a heat-cured coating a remarkably flexible, adherent and hard porcelain-like finish which resists staining and discoloration upon subjection to heat or light.

The heat-hardening aromatic solvent-soluble amine resins which may be blended with the new resins of the invention are condensation products of an aldehyde, particularly formaldehyde, with a material selected from the group consisting of urea, melamine, benzoguanamine and dicyandiamide. The aldehyde component is present in molecular excess and the condensation product is desirably reacted with an alcohol such as a saturated alkanol containing from 3–8 carbon atoms in the molecule to provide desirable heat-hardening and aromatic solvent-solubility properties.

Baking of the blend may be effected at temperatures of from 275–325° F. for 10–30 minutes. Higher baking temperatures applied for progressively shorter times may also be used since the base resin is thermally stable. The low baking temperature illustrates the versatility of application possessed by the new resins. In certain selected blends with amino resin, as will be described more fully hereinafter, an adequate cure may be obtained in from 10 to 30 minutes at temperatures as low as 150° F.

The base resins of the invention are desirably cold blended with the amino resin in a wide range of proportions, e.g., within the weight ratio range of from 1:4 to 4:1, preferably from 1:3 to 3:1. While the pure resins which are blended are each useful per se, the blends provide improved toughness, flexibility and chemical resistance. Interestingly, blends containing less than 1 part of either component per 4 parts of the other component do not provide useful coatings within the scope of the invention since the blends are brittle and lack gloss.

Blends including heat-hardening urea formaldehyde condensates in the presence of an acid catalyst, e.g., phosphoric acid, are particularly advantageous in providing a composition which cures in from 10–30 minutes at baking temperatures as low as 150–200° F. This is illustrated by a 50:50 weight ratio blend of the base resin with a urea formaldehyde produced by condensing area with 1.8 mols of formaldehyde per mol or urea in alkaline medium, the blend being produced in a xylol-butanol solvent medium. The resulting solution containing 1% based on resin solids of phosphoric acid cured in 10 minutes at 175° F.

Pigmented coatings are desirably prepared from cold blends of amino resin and base resin of the invention by grinding in from 2 to 10 parts of pigment to 1 part of resin solids (50% resin solids in toluol-butanol or xylol-butanol) in a sand grinder or pebble mill until the desired dispersion is achieved. The pigmented mixture is diluted with resin solution in toluol-butanol or xylol-butanol to give a pigment to binder weight ratio of about 0.5–1.2 to 1.0, preferably from 0.8–1.0 to 1.0.

The clear or pigmented coating compositions described may have incorporated therein up to 20% by weight based on the weight of the composition of a heat-stable plasticizer. The presence of the plasticizer tends to improve the flexibility of the cured coating. Preferred plasticizers are illustrated by dialkyl esters of dicarboxylic acids or anhydrides such as the dimethyl or dioctyl esters of phthalic or sebacic acid. Further preferred plasticizers are polymers of dicarboxylic acids or anhydrides such as phthalic or sebacic acids with aliphatic diols, e.g., ethylene glycol. The preferred plasticizers referred to above enhance the flexibility of baked coatings without deleteriously affecting the chemical or ultra-violet light resistance thereof.

It is preferred to employ the resin for coating at a concentration of about 40–50% resin solids in an aromatic solvent solution containing a liquid aromatic hydrocarbon solvent and butanol.

The new epoxy resins produced by the invention can be used directly as a laminating resin or molding resin for cellulosic fabric and glass woven fabric, the resin in aromatic solvent solution serving to impregnate the fabric or a cellulosic or glass fibrous filler and thereafter the product is cured at atmospheric pressure or low pressure up to 100 pounds per square inch at temperatures of from 275–350° F. The products are porcelain-hard at the resin surface and have excellent adhesion to alkyd resin primed surfaces as well as epoxy resin primed surfaces. Valuable laminated cellulosic and glass fabrics can be prepared by bonding melamine formaldehyde resin impregnated plies of glass fabric to similar plies impregnated with the modified epoxy resins of the invention and by heating and pressing at low pressure at a temperature of about 350° F. for 20 minutes. Another important utility is the provision of porcelain-like coatings hardened by addition of aromatic solvent-soluble, heat-reactive hardening amino resins as specified hereinbefore to provide a cured finish possessing a mirror finish.

The invention is illustrated in the following examples.

EXAMPLE I

To a kettle fitted with a reflux condenser and water separator there is charged 24.5 mols (15,430 parts) of a diglycidyl ether of bisphenol A having an average molecular weight of 630, a hydroxyl functionality of 5.5 and a melting point of 40–50° C. (Durrans), 40.7 mols (4970 parts) of benzoic acid, 155 parts of a 10% solution of potassium hydroxide in ethanol and 1,115 parts of xylene. The mixture blended in the kettle with stirring was heated to reflux for 1 hour at a pot temperature of 190° C. The pot temperature of 190–195° C. was maintained by adding xylene and samples were taken at intervals to check the acid number of the mixture. As soon as the acid number dropped to less than 2, the mixture was cooled to 150° C. and 40.7 mols (6040 parts) of phthalic acid anhydride and additional xylene in an amount of 1,300 parts were added and the mixture heated to 170° C. pot temperature at which temperature the esterification reaction of the Epon benzoate and phthalic anhydride took place with evolution of by product water of condensation collected in the water separator. After reacting at 170–175° C. at reflux for 3½ hours the acid number determined by sampling the mixture dropped to a value of about 60. Cooking was continued an additional ½ to 1 hour until the viscosity of the product at 60% solids in a 3:1 mixture of xylol and butanol had a value of V–Z on the Gardner-Holdt viscosity scale.

The heat was turned off and the mixture was then cooled to 145° C. and xylol was added to provide a total of 13,185 parts of xylol. Then normal butanol was added in an amount of 4,395 parts to thereby adjust the resin solids to 60% in a 3:1 xylol-butanol mixture. The acid number lies between a value of 50 and 60 and the viscosity in 3:1 xylol-butanol has a value of between Y and Z2 on the Gardner-Holdt scale, while the color of the resin solution has the value of between 1 and 4 on the Gardner-Holdt scale.

The above resin solution is then blended at a temperature below 70° C. with butylated melamine-formaldehyde resin in xylol-butanol (60% melamine-formaldehyde resin solids) in a ratio, dry resin weight basis of 80 parts of Epon benzoate phthalate to 20 parts of melamine-formaldehyde resin solids. The viscosity of the cold-blended mixture in 3:1 xylol-butanol at 60% resin solids was X–Y on the Gardner-Holdt scale, the acid number 40–50 and the color (Gardner-Holdt scale) had a value of 3.

Cold blends were also prepared of an admixture of the Epon benzoate phthalate of this example with 50% resin solids solution in 3:1 xylol-butanol to provide a solution containing an 80-20 mixture of base resin and amino resin as follows:

(a) Alcohol soluble melamine formaldehyde resin;
(b) Alcohol soluble urea-formaldehyde resin;
(c) Alcohol soluble benzoguanamine formaldehyde resin;
(d) Alcohol soluble dicyandiamide formaldehyde resin;

and in each of these cases the acid number observed was 40–50, viscosity value X–Y on Gardner-Holdt scale and color value 3 on the Gardner-Holdt color scale.

Each of the above cold-blended solutions were stored for 6 months in enamel lined drums. No change in viscosity value was noted after standing demonstrating the excellent storage stability of these compositions.

Each of the compositions were pigmented with TiO$_2$ pigment in a pigment to binder weight ratio of 0.8–1.0 to 1.0 and panels were coated with the pigmented compositions and the panels baked at 275–325° F. for 30 minutes.

The following table summarizes the comparison of the properties of coatings made by this example with similar coatings prepared by cold blending a lauric acid modified alkyd resin, 80 parts, with melamine resin, 20 parts, this blend being pigmented in the same way as the cold blend compositions under test. This alkyd-melamine coating composition is selected for comparison because it represents a standard baking finish finding widespread utility as a baking finish for wall board, appliances and kitchen cabinets and is generally recognized to be the best of conventional materials for this purpose. The alkyd-melamine composition also was baked at 275–325° F. for 30 minutes.

Table I

| Resin | Pencil Hardness Test | Iodine Resistance | Shoe Polish Resistance | Nail Polish Resistance | Resistance (20 parts Acetone and 80 parts water) |
|---|---|---|---|---|---|
| Alkyd-Melamine | 3H | failed | failed | failed | failed. |
| Epon benzoate phthalate and melamine formaldehyde resin. | 5H | passed | passed | passed | passed. |
| Epon benzoate phthalate and urea-formaldehyde resin. | 5H | do | do | do | Do. |
| Epon benzoate phthalate and benzoguanamine formaldehyde resin. | 5H | do | do | do | Do. |
| Epon benzoate phthalate and dicyandiamide formaldehyde resin. | 5H | do | do | do | Do. |

The various stain resistance tests in Table I were carried out by placing 5 to 10 drops of reagent on the coated surface and then covering the surface and the drops with a 1 inch diameter watch glass. The watch glass and reagent is then permitted to stand 24 hours after which the watch glass is removed and the coated surface is washed with soap solution and then with ethanol. Failure is indicated by anything more than a light stain, or swelling or dulling of the coating.

The iodine stain resistance test was carried out using a 2% tincture of iodine solution as the reagent.

The shoe polish stain resistance test was carried out using a dye type liquid polish (Dyanshine) as the reagent.

The nail polish stain resistance test was carried out using Certainly Red Revlon nail polish as the reagent.

Example I was repeated using 22.5 mols of diglycidyl ether of bisphenol having a molecular weight of approximately 900 and a hydroxyl functionality of 6.0, 40.7 mols of benzoic acid and 40.7 mols of phthalic acid anhydride. Substantially identical results were obtained.

EXAMPLE II

This example illustrates the preparation of coated Masonite and fiber board panels to provide a solvent resistant, stain resistant, hard, high gloss, protective and decorative coating for the panels making them suitable for table tops and counters in place of conventional urea-formaldehyde paper laminates used for this purpose.

A highly pigmented, low gloss ground coat employing a blend of soya acid-modified alkyd, 80 parts, with urea-formaldehyde resin, 20 parts, as vehicle, was used to prime and fill the board pattern of a Masonite panel and the Epon benzoate phthalate cold-blend mixture with melamine formaldehyde resin (80/20) was employed as a clear topcoat. The topcoat flowed well and adhered exceptionally well to the primer coat after baking at 300° F. for 25 minutes and provided a glossy mirror finish.

In this same manner there were prepared decorated panels in which the ground coat was overprinted in various colors with inks or pigments to simulated wood grain or geometric designs, then topcoated as before and a variety of diversely decorated heat-resistant, stain resistant and chemical resistant panels were thus prepared.

Similar panels were prepared using the Epon benzoate phthalate composition cold blended with urea-formaldehyde resin, this composition cold blended with benzoguanamine formaldehyde resin and this composition cold blended with dicyandiamide formaldehyde resin in the proportions and by the procedure as set forth in Example I. These panels cured to a glossy mirror finish.

These panels and those prepared from the Epon benzoate phthalate cold-blend with melamine formaldehyde resin were tested for resistance to discoloration by ultraviolet light and found to possess exceptional resistance towards discoloration by ultraviolet both at room temperature and at elevated temperatures of 60° C.

EXAMPLE III

This example illustrates a modification of the composition illustrated in Example I. The procedure in Example I was followed precisely except that instead of using 40.7 mols of phthalic anhydride a mixture of 20.35 mols of adipic anhydride and 20.35 mols of phthalic anhydride was reacted after the Epon benzoate was prepared.

The final composition was cold blended with butylated melamine formaldehyde resin in a ratio, based upon solids weight, of 80:20 and the composition provided hard porcelain-like baked films possessing superior heat-resistance, light resistance, stain resistance and improved flexibility in comparison with the compositions used in Example II.

EXAMPLE IV

This example illustrates the preparation of a flame-resistant finish having the properties of the compositions shown in Examples I and II. Following the procedure of Example I a composition was prepared using tetrachloro phthalic anhydride (40.7 mols) instead of phthalic anhydride and a mixture of 35.0 mols of tetrachloro phthalic anhydride and 5.7 mols of phthalic anhydride. The products were similar to those shown in Examples I and II. The product prepared by complete replacement of phthalic anhydride was slightly better for flame resistance than the product prepared by partial replacement. Both of the products prepared using tetrachloro phthalic anhydride were otherwise equivalent in properties to the product of Example I but better as to flame resistance.

The invention is defined in the claims which follow.

I claim:

1. A synthetic resin composition comprising the condensation product of (I) a dicarboxylic acid anhydride selected from the group consisting of aromatic ortho-substituted dicarboxylic acid anhydrides, saturated aliphatic dicarboxylic acid anhydrides and mixtures thereof with (II) a resinous ester having an acid number less than 2 of a monocarboxylic aromatic acid having a single carboxyl group as the sole functional group thereof and resinous diglycidyl ether of a dihydric phenol having an average molecular weight of from 500 to 1500, an hydroxyl functionality of from 3 to 10 per mol of resinous ether and an epoxy equivalency of at least 1.4, said monocarboxylic aromatic acid being present in said resinous ester in an amount to provide substantially one mol of monocarboxylic acid for each mol of dicarboxylic acid anhydride and said monocarboxylic acid and dicarboxylic acid anhydride together supplying carboxyl functionality in an amount of from 70–95% of the total hydroxyl functionality supplied by said ether, said condensation product having an acid number of from 30–80.

2. The synthetic resin composition of claim 1 in which said monocarboxylic acid and dicarboxylic acid anhydride together supply carboxyl functionality in an amount of from 80–92% of the total hydroxyl functionality supplied by said ether.

3. The synthetic resin composition of claim 1 in which said anhydride is ortho phthalic anhydride and said aromatic acid is a benzoic acid.

4. The synthetic resin composition of claim 1 in which said diglycidyl ether of a dihydric phenol is a diglycidyl ether of a bisphenol having an average molecular weight of from 600–1000, an hydroxyl functionality of from 4 to 8 per mol of resinous ether and an epoxy equivalency of at least 1.8.

5. The synthetic resin composition of claim 4 in which said monocarboxylic acid and dicarboxylic acid anhydride together supply carboxyl functionality in an amount of from 80–92% of the total hydroxyl functionality supplied by said ether.

6. The synthetic resin composition of claim 4 in which said anhydride is ortho phthalic anhydride and said aromatic acid is a benzoic acid.

7. The synthetic resin composition of claim 4 in which said condensation product has an acid number of from 40–70.

8. A synthetic resin composition comprising a mixture of (A) the condensation product of (I) a dicarboxylic acid anhydride selected from the group consisting of aromatic ortho-substituted dicarboxylic acid anhydrides, saturated aliphatic dicarboxylic acid anhydrides and mixtures thereof with (II) a resinous ester having an acid number less than 2 of a monocarboxylic aromatic acid having a single carboxyl group as the sole functional group thereof and resinous diglycidyl ether of a dihydric phenol having an average molecular weight of from 500 to 1500, an hydroxyl functionality of from 3 to 10 per mol of resinous ether and an epoxy equivalency of at least 1.4, said monocarboxylic aromatic acid being present in said resinous ester in an amount to provide substantially one mol of monocarboxylic acid for each mol of dicarboxylic acid anhydride and said monocarboxylic acid and dicarboxylic acid anhydride together supplying carboxyl functionality in an amount of from 70–95% of the total hydroxyl functionality supplied by said ether, said condensation product having an acid number of from 30–80, and (B) a heat-hardening amino resin soluble in a mixture of liquid aromatic hydrocarbon solvent and alkanol and selected from the group consisting of formaldehyde condensation products with melamine, urea, benzoguanamine, dicyandiamide, and mixtures thereof, said components (A) and (B) being present in said mixture in a weight ratio range of from 1:4 to 4:1.

9. The synthetic resin composition of claim 8 in which said monocarboxylic acid and dicarboxylic acid together supply carboxyl functionality in an amount of from 80–92% of the total hydroxyl functionality supplied by said ether.

10. The synthetic resin composition of claim 8 in which said anhydride is ortho phthalic anhydride and said aromatic acid is a benzoic acid.

11. The synthetic resin composition of claim 8 in which said diglycidyl ether of a dihydric phenol is a diglycidyl ether of a bisphenol having an average molecular weight of from 600–1000, a hydroxyl functionality of from 4 to 8 per mol of resinous ether and an epoxy equivalency of at least 1.8.

12. The synthetic resin composition of claim 8 in which said condensation product has an acid number of from 40–70.

13. The synthetic resin composition of claim 8 in which said composition includes up to 20% by weight based on the weight of the composition of heat-stable plasticizer.

14. The synthetic resin composition of claim 13 in which said plasticizer is a dialkyl ester of a dicarboxylic acid.

15. The synthetic resin composition of claim 13 in which said plasticizer is a polymer of a dicarboxylic acid with an aliphatic diol.

16. A synthetic resin composition comprising a mixture of (A) the condensation product of (I) a dicarboxylic acid anhydride selected from the group consisting of aromatic orthosubstituted dicarboxylic acid anhydrides, saturated aliphatic dicarboxylic acid anhydrides and mixtures thereof with (II) a resinous ester having an acid number less than 2 of a monocarboxylic aromatic acid having a single carboxyl group as the sole functional group thereof and resinous diglycidyl ether of a dihydric phenol having an average molecular weight of from 600 to 1000, a hydroxyl functionality of from 4 to 8 per mol of resinous ether and an epoxy equivalency of at least 1.8, said monocarboxylic aromatic acid being present in said resinous ester in an amount to provide substantially one mol of monocarboxylic acid for each mol of dicarboxylic acid anhydride and said monocarboxylic acid and dicarboxylic acid anhydride together supplying carboxyl functionality in an amount of from 80–92% of the total hydroxyl functionality supplied by said ether, said condensation product having an acid number of from 40–70, and (B) a heat-hardening amino resin soluble in a mixture of liquid aromatic hydrocarbon solvent and alkanol and selected from the group consisting of formaldehyde condensation products with melamine, urea, benzoguanamine, dicyandiamide, and mixtures thereof, said components (A) and (B) being present in said mixture in a weight ratio range of from 1:3 to 3:1.

17. The synthetic resin composition of claim 16 in which said anhydride is ortho phthtalic anhydride and said aromatic acid is a benzoic acid.

18. The synthetic resin composition of claim 16 in which said amino resin is an alkylated melamine formaldehyde resin.

19. The synthetic resin composition of claim 16 in which said amino resin is a urea formaldehyde resin.

20. The synthetic resin composition of claim 19 in which said mixture includes phosphoric acid as catalyst.

21. A method of preparing a synthetic resin composition comprising condensing at a temperature of from 125–200° C. in an aromatic solvent (I) a dicarboxylic acid anhydride selected from the group consisting of aromatic ortho-substituted dicarboxylic acid anhydrides, saturated aliphatic dicarboxylic acid anhydrides and mixtures thereof with (II) a resinous ester having an acid number less than 2 of a monocarboxylic aromatic acid having a single carboxyl group as the sole functional group thereof and resinous diglycidyl ether of a dihydric phenol having an average molecular weight of from 500 to 1500, a hydroxyl functionality of from 3 to 10 per mol of resinous ether and an epoxy equivalency of at least 1.4, said monocarboxylic aromatic acid being present in said resinous ester in an amount to provide substantially one mol of monocarboxylic acid for each mol of dicarboxylic acid anhydride and said monocarboxylic acid and dicarboxylic acid anhydride together supplying carboxyl functionality in an amount of from 70–95% of the total hydroxyl functionality supplied by said ether and cooling the reaction mixture to a temperature below 100° C. to stop said condensation when the acid number of the product is within the range of 30–80.

22. A method of preparing a heat-curable room temperature stable synthetic resin composition comprising condensing at a temperature of from 125–200° C. in an aromatic solvent (I) a dicarboxylic acid anhydride selected from the group consisting of aromatic ortho-substituted dicarboxylic acid anhydrides, saturated aliphatic dicarboxylic acid anhydrides and mixtures thereof with (II) a resinous ester having an acid number less than 2 of a monocarboxylic aromatic acid having a single carboxyl group as the sole functional group thereof and resinous diglycidyl ether of a dihydric phenol having an average molecular weight of from 500 to 1500, a hydroxyl functionality of from 3 to 10 per mol of resinous ether and an epoxy equivalency of at least 1.4, said monocarboxylic aromatic acid being present in said resinous ester in an amount to provide substantially one mol of monocarboxylic acid for each mol of dicarboxylic acid anhydride and said monocarboxylic acid and dicarboxylic acid anhydride together supplying carboxyl functionality in an amount of from 70–95% of the total hydroxyl functionality supplied by said ether, cooling the reaction mixture to a temperature below 100° C. to stop said condensation when the acid number of the product is within the range of 30–80 and thereafter cold blending said condensation product with a heat-hardening amino resin soluble in a mixture of liquid aromatic hydrocarbon solvent and alkanol and selected from the group consisting of formaldehyde condensation products with melamine, urea, benzoguanamine, dicyandiamide, and mixtures thereof, said condensation product and said amino resin being blended together in a weight ratio range of from 1:4 to 4:1.

References Cited in the file of this patent

UNITED STATES PATENTS

| | | |
|---|---|---|
| 2,637,715 | Ott | May 5, 1953 |
| 2,703,765 | Osdal | Mar. 8, 1955 |
| 2,732,367 | Shokal | Jan. 24, 1956 |
| 2,759,901 | Greenlee | Aug. 21, 1956 |
| 2,928,809 | Hicks | Mar. 15, 1960 |